June 20, 1961  R. A. EGLES  2,989,115
SEAT TYPE FUEL TANK FOR BOATS
Filed Oct. 21, 1958
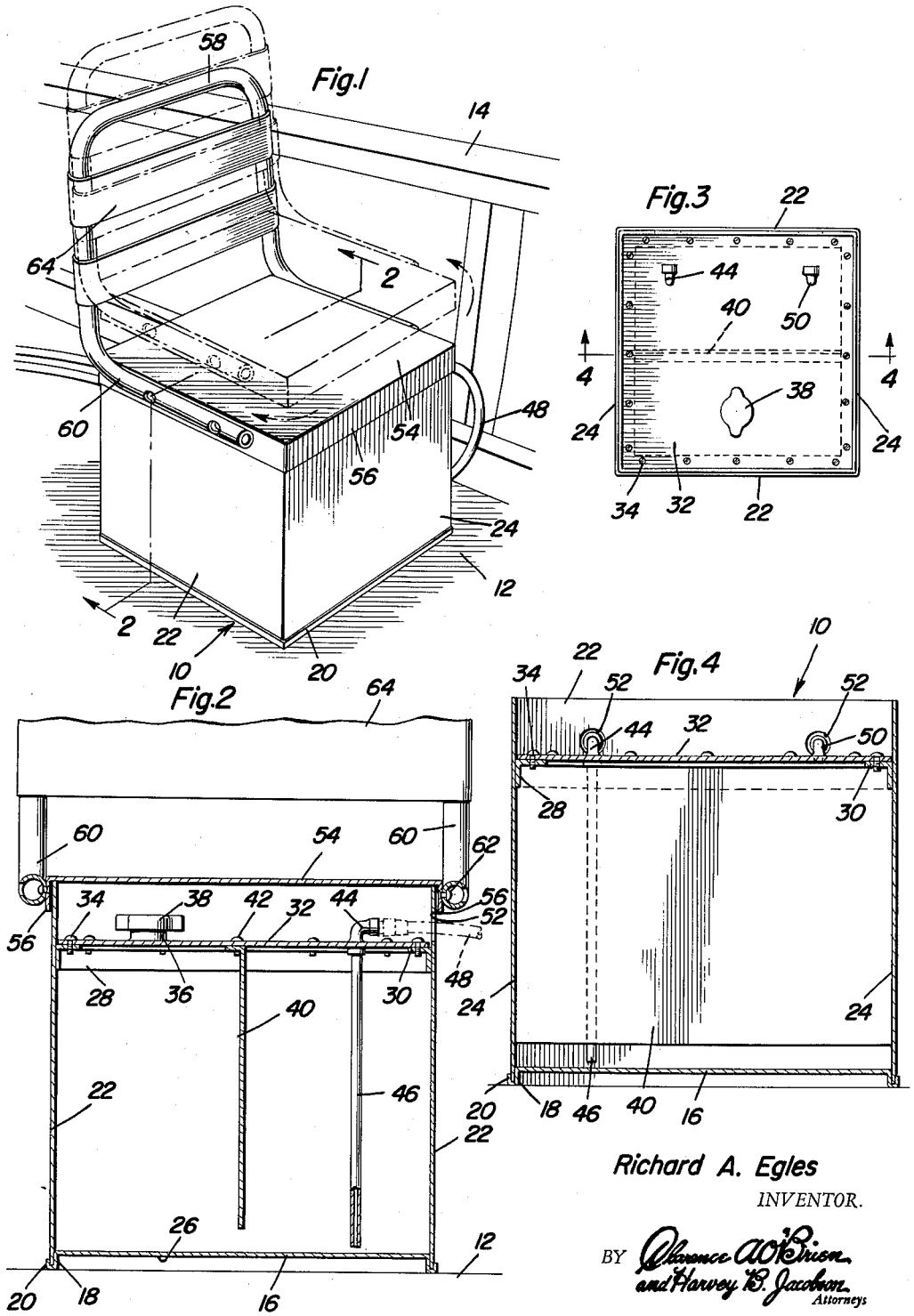
Richard A. Egles
INVENTOR.

United States Patent Office 2,989,115
Patented June 20, 1961

2,989,115
SEAT TYPE FUEL TANK FOR BOATS
Richard A. Egles, 310 E. 37th St., Hialeah, Fla.
Filed Oct. 21, 1958, Ser. No. 768,773
4 Claims. (Cl. 155—191)

The present invention generally relates to a seat for boats and more particularly to a seat mounted on a fuel tank in such a manner that the area immediately under the seat is provided utility for carrying a supply of fuel with the seat structure being adjustable about a vertical axis so that the seat may be used for various purposes and in various orientations in relation to the boat.

In recent years, outboard motors have been constructed which are for dependable operation and for long trips. However, the fuel supply tank normally provided with such outboard motors is not adequate in many installations. Therefore, the prevalent practice is for the boat operator to provide one or several extra containers for fuel which may be hooked directly to the fuel supply system of the outboard motor or outboard motors. These fuel supply containers are normally loosely positioned in the open cockpit of a boat and take up a considerable area of the boat space and have no other utility except for carrying fuel due to their usual handles and other projections on the top surface thereof. Such boats are also usually provided with remote control steering mechanisms and also other controls and the operator of the boat normally desires a seat while operating the boat for long periods of time. There are also provided, at times, a seat for passengers or for purposes of providing comfort to persons fishing from the boat. Therefore, it is the primary object of the present invention to provide a fuel tank for such a boat which is constructed with a removable seat on the top thereof with the seat concealing the filler cap and opening and also being removable so that the seat may be employed for an operator of the boat to lean against or for the operator to lean against when he is fishing over the side or when facing rearwardly or when the device is mounted adjacent the stern of the boat, then a fisherman may employ the seat in any of the four previously mentioned orientations.

Another object of the present invention is to provide a seat type fuel tank for boats having a baffle therein for preventing excessive shifting of liquid fuel and also provided with the usual inlet openings and vented closure cap together with a suction line terminating adjacent the bottom of the tank for connection to the fuel supply line of an outboard motor or motors.

A further important feature of the present invention is to provide a seat type fuel tank which is simple in construction, easy to install, well adapted for its intended purposes and relatively inexpensive to manufacture.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

FIGURE 1 is a perspective view of the seat type fuel tank of the present invention installed in a boat illustrating the removability of the seat in dotted line and also the ability of the seat to rotate about a vertical axis when the same is elevated off of the tank;

FIGURE 2 is a transverse, vertical sectional view taken substantially upon a plane passing along section line 2—2 of FIGURE 1 illustrating the details of construction of the seat type fuel tank;

FIGURE 3 is a plan view of the seat type fuel tank with the seat removed illustrating the construction of the refill cap and the fluid lines; and FIGURE 4 is a vertical sectional view taken substantially upon a plane passing along section line 4—4 of FIGURE 3 illustrating further structural details of the fuel tank.

Referring now specifically to the drawings, the numeral 10 generally designates the seat type fuel tank for boats which is illustrated as being mounted on a deck 12 alongside of the gunwale 14 of a conventional boat. The tank may be secured to the deck 12 in any suitable manner and preferably in a permanent manner so that the tank is rigidly secured in position.

The tank 10 includes a square bottom plate 16 having a downturned edge 18 terminating in an upwardly facing peripheral flange 20 for receiving side and end walls 22 and 24 respectively. The downturned flange 18 forms a recess 26 which may receive a mounting board therein which may be secured to the deck 12.

Spaced below the upper ends of the side and end walls 22 and 24 is an annular angle iron member 28 having an inturned horizontal flange 30 supporting a top member 32 which is secured thereto by fasteners 34. The side and end walls 22 and 24 are joined to the bottom 26 in a liquid tight manner and the top 32 is secured to the angle iron member 28 which in turn is secured to the side and end walls in a liquid tight manner thus forming an enclosed tank for receiving fuel.

The top 32 is provided with a filler neck and opening 36 having a cap 38 thereon for permitting the fuel in the tank to be replenished.

Mounted on the top 32 and depending centrally therefrom is a baffle plate 40 which extends fore and aft and which is secured in position by fastening members 42.

Adjacent to one of the side walls 22, the top 32 is provided with an L-shaped adapter fitting 44 extending through the top 32 and having an intake line 46 connected thereto and terminating adjacent the bottom 26. The fitting 44 is adapted to connect to the fuel supply line 48 connected to the fuel pump or fuel system of the motor. Also provided in the top 32 in alignment with the fitting 44 is a fitting 50 of similar construction which forms a return line for the bypass fuel and for also forming a vent for the tank. The side wall 22 adjacent the fittings 44 and 50 is provided with a pair of openings 52 for receiving the fuel line 48.

It is also noted that the top 38 and fittings 44 and 50 are disposed below the upper edges of the side and end walls 22 and 24.

A seat member 54 which may be in the form of a flat plate is provided with a depending peripheral flange 56 which telescopes over the upper edge of the walls 22 and 24 and the seat 54 may be padded if desired. A generally U-shaped tubular rod back forming member 58 is connected to the seat 54 by virtue of the lower ends of the legs 60 extending forwardly and being secured to the side flanges 56 by fasteners 62. Transverse flexible straps 64 interconnect the vertical legs of the back forming member 58 thus forming a back rest for a person sitting on the seat 54.

Inasmuch as the tank is square as shown in FIGURE 3, the seat 54 may be positioned thereon in any of four different angular positions thus providing the back rest 58 at four different positions so that a fisherman or operator of the boat may be properly positioned for fishing in different positions or for operating the boat. The vertical movement and rotation of the seat and back rest is shown in FIGURE 1 and it will be seen that this construction utilizes the space underlying the seat thus making efficient use of the space in the boat. Also, the orientation of the tank may be varied to provide proper positioning of the fittings 44 and 50 for use with outboard motors or with an inboard motor if desired.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A combined seat and fuel tank for boats comprising a hollow enclosed tank for fuel including bottom, top and side walls, said side walls extending above said top wall and terminating a spaced distance thereabove, fuel handling and accommodating means in said top wall, a seat plate provided with an upwardly extending backrest, said tank and plate being square whereby the backrest may be orientated in one of four positions about a vertical axis and said plate overlying the upper end of said tank and resting upon the upper edges of said side walls, depending flanges on said seat plate for telescopic engagement with the upper portions of said side walls extending above said top wall for mounting said seat plate on said tank in spaced relation to said top wall and for providing space for said fuel handling and accommodating means therebetween.

2. The combination of claim 1 including an aperture formed in one of said side walls above said top wall adapted to receive therethrough a fuel supply line.

3. The combination of claim 1 including an aperture formed in one of said side walls above said top wall adapted to receive therethrough a fuel supply line, the portions of said side walls above said top wall extending therebeyond a greater distance than said flanges depend from said seat plate.

4. A combined seat and fuel tank for boats comprising a hollow enclosed tank for fuel including top, bottom and side walls, said side walls extending above said top wall, terminating a spaced distance above the latter and defining a closed perimeter wall formed by a plurality of equal segments spaced equal distances from a geometric center, fuel handling and accommodating means in said top wall, a seat plate overlying the upper edges of said perimeter wall and provided with an upwardly extending backrest, depending flanges on said seat plate defining equal flange segments proportional in length to the segments of said perimeter wall, spaced equal distances from said center and disposed outwardly of and in telescopic engagement with said perimeter wall segments for mounting said seat plate on said tank in a manner to accommodate rotational reorientation of said seat plate about a vertical axis relative to said tank and in spaced relation to said top wall for providing space for said fuel handling and accommodating means between said seat plate and said top wall.

References Cited in the file of this patent

UNITED STATES PATENTS

| | | |
|---|---|---|
| 482,912 | Bornemann | Sept. 20, 1892 |
| 2,765,025 | Bakalic | Oct. 2, 1956 |
| 2,812,227 | Hill | Nov. 5, 1957 |
| 2,828,909 | Sollenberger | Apr. 1, 1958 |
| 2,845,111 | Barecki | July 29, 1958 |